United States Patent [19]

Shannon

[11] 4,397,764
[45] Aug. 9, 1983

[54] POLYMER-SUPPORTED ETHYLENE POLYMERIZATION CATALYST

[75] Inventor: Mark L. Shannon, Ponca City, Okla.

[73] Assignee: Conoco Inc., Ponca City, Okla.

[21] Appl. No.: 362,182

[22] Filed: Mar. 26, 1982

[51] Int. Cl.$^3$ ................................................ C08F 4/64
[52] U.S. Cl. ................................ 252/429 B; 526/134
[58] Field of Search ...................................... 252/429 B

[56] References Cited

U.S. PATENT DOCUMENTS

| | | | |
|---|---|---|---|
| 3,702,309 | 11/1972 | Ziegler et al. | 252/429 B X |
| 4,021,599 | 5/1977 | Kochhar et al. | 252/429 B X |
| 4,161,462 | 7/1979 | Bocharov et al. | 252/429 B |

*Primary Examiner*—Patrick Garvin
*Attorney, Agent, or Firm*—Cortlan R. Schupbach, Jr.

[57] ABSTRACT

A polymer-supported ethylene polymerization catalyst prepared by a method comprising (a) a polymer supported titanium-based catalyst consisting of
(1) a polymer resin containing an amino borane reducing agent;
(2) a titanium tetrahalide;
(3) and a suitable organometallic and/or organic metallic co-catalyst.

The polymers produced are resins of high density and melting point.

13 Claims, No Drawings

POLYMER-SUPPORTED ETHYLENE POLYMERIZATION CATALYST

The instant invention relates to a polymer-supported ethylene polymerization catalyst. More specifically, the instant invention relates to a method of preparing a polymer-supported ethylene polymerization catalyst capable of producing polymer resins of high density and melting point.

Heterogeneous and homogeneous catalysts for polymerization of ethylene together with other olefins are known in the art. For example, metal oxides and complex organometallic catalysts are known olefin polymerization catalysts.

Many of the known catalysts have disadvantages which prohibit commercial utilization. Among such disadvantages are difficulty of preparation, chemical instability such as deactivation of the catalyst with time, retention of the catalyst in the polymer which impairs polymer properties and restricted range of application.

Representative but non-exhaustive of the art in this area is U.S. Pat. No. 3,152,088 which teaches a method for forming a catalyst utilizing titanium tetrachloride on an inert support. This material is then treated with an organometallic compound of Group II or III metals, also on an inert polymer support. Thereafter, titanium tetrachloride is reduced to its trichloride form on a polymeric support. In this complex preparation, three polymeric materials are used, each supporting one of the catalytic components, and requiring strict controls on preparation.

U.S. Pat. Nos. 4,161,462 and 4,182,818 likewise teach catalysts for the polymerization of ethylene and olefins. These catalysts are prepared by supporting titanium chloride on a rubbery polymer support containing an electron donor and/or electron acceptor groups. This material is then mixed with an organometallic compound of Group I to Group III metals as a co-catalyst.

U.S. Pat. No. 3,652,514 utilizes a catalyst system for olefin polymerization containing a mixture of titanium tetrachloride and polyaminoalane. This system contains polymer support.

Thus it is known that ethylene polymers can be made under conditions of high pressure and temperature exhibiting a high degree of random branching of polymer chains and a low polymer specific gravity, ranging from about 0.92 to about 0.93. Ethylene polymers can also be made at relatively low pressures and temperatures by the use of a transition metal base catalyst system with titanium with an organoaluminum or organoaluminum halide compound. These polymers have a relatively high specific gravity, ranging from about 0.94 to about 0.965, with a high degree of linearity in polymer chains. These changes in linearity and specific gravity caused changes in the characteristics of the polymers elasticity, melting point and hardness. Much of the work in the prior art has been carried out to modify polymerization catalysts for high density, low pressure processes by the use of inorganic supports and/or inorganic, organic or organometallic additives. However, all of these processes have certain disadvantages in that the catalysts are unstable, remain in the polymer or are difficult to prepare.

It would therefore be of great benefit to provide a simple process for obtaining a supported, stable ethylene polymerization catalyst which is effective in producing resins having high melting point and high specific gravity and suitable for producing useful articles.

It is therefore an object of the present invention to provide a method for obtaining a catalyst suitable for the polymerization of ethylene or the copolymerization of ethylene and olefins to produce a useful polymer having high melting point and specific gravity. Other objects will become apparent to those skilled in this art as the description proceeds.

It has now been discovered in accordance with the present invention that a method for preparing a catalyst for olefin polymerizations and copolymerizations comprises reacting, under an inert atmosphere, (1) a polymeric resin containing bound therein an aminoborane reducing agent, said resin suspended in an inert diluent, and
(2) a titanium tetrahalide compound, then
(3) allowing reaction to proceed between (1) and (2) to produce a solid, then recovering said solid, and
(4) combining said solid with an organometallic, organometallic halide or an organometallic hydride co-catalyst or mixtures of these prior to carrying out a polymerization. The combination of step (4) can also be conveniently carried out in-situ during polymerization.

In the method of the present invention, the reaction between a polymeric resin containing an amino borane reducing agent and a titanium tetrahalide compound is allowed to proceed at temperatures of from about 0° C. to about 100° C. for a length of time sufficient for the reaction to go to completion. Normally, this length of time will range from about 5 minutes to about 24 hours. Normally this reaction should take place under a dry, inert atmosphere. The dry atmosphere provides a catalyst of superior activity and quality.

The resin containing the amino borane reducing agent is normally a polymeric resin (synonomous with polymer for the purpose of this specification and claims) which is non-rubbery in nature. Representative but non-exhaustive examples of such resins are polystyrene resins, polyvinyl alcohol resins, polyvinyl chloride resins, polyethylene resins, polybutene resins, and alloys, copolymers, blends, derivatives as defined in Hackh's Chemical Dictionary 4th Edition, 1969 and analogues of these polymers.

Normally this reaction is carried out using a diluent. The diluent should be a dry organic compound and should contain substantially no free oxygen. Representative but non-exhaustive examples of satisfactory inert diluents are hexane, cyclohexane, toluene, ether, n,n-dimethylformamide, acetone, and acetonitrile as well as mixtures and analogues of these materials.

The reaction between the polymeric resin, the aminoborane reducing agent contained therein and the titanium tetrahalide compound produces a solid which can be separated from the inert diluent using well known separatory means such as filtration, centrifugation, decantation, and the like. To this recovered solid is added an organometallic compound, an organometallic halide or an organometallic hydride co-catalyst. Mixtures of these materials can be used. Representative but non-exhaustive examples of satisfactory co-catalysts are dibutyl magnesium, butyl ethyl magnesium Grignard reagents, diethylaluminum chloride, triethylaluminum, diisobutylaluminum iodide, diisobutylaluminum hydride, lithium triethyl borohydride, and mixtures of these compounds.

Combining the co-catalysts with the recovered solid of the initial reaction requires only that materials be mixed in the desired proportions. Normally, the amount of co-catalyst in relation to the solid will range from about 20 to about 500 percent by weight based upon the total weight of the catalyst. From about 150% to about 400% by weight are preferred.

The polymer with the aminoborane reducing agent bound therein can contain any aminoborane compound which is effective. Representative but non-exhaustive examples of such amino borane reducing agents are those having the general formulas

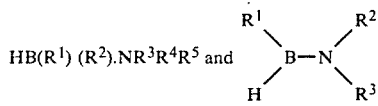

wherein $R^1$, $R^2$, $R^3$, $R^4$, and $R^5$ are, independently, hydrogen alkyl groups, cycloalkyl groups, and aryl groups, each containing from 1 to 16 carbon atoms, or hydrogen. These materials are placed on polymer supports through well known methods such as mixing or aminosis, as described in *Polymer Chemistry*, M. P. Stevens, Addison-Wesley Publishing Co., 1975; *Polymer Review*, Volume 16 Graft Copolymers, Interscience Publishers, 1967; and *Textbook of Polymer Science*, Interscience Publishers, 1962, and references listed in these articles.

After placing on the polymer, the amino boranes will have the general formulas

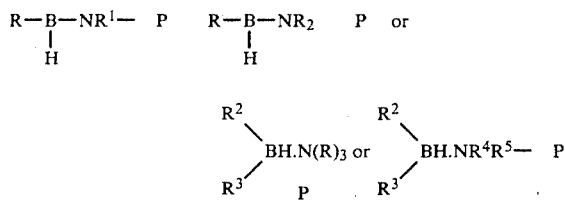

wherein P represents the polymer support.

Representative but non-exhaustive examples of amino borane materials useful in the present invention are

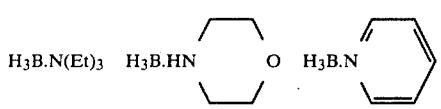

$H_3B.NH_3$ and derivatives of these formed by addition of materials such as olefins, as described in the *Journal of Organometallic Chemistry*, volume 100, pages 3–15 (1975); Coates and Wade, *Organometallic Compounds*, volume 1 (3rd Edition), Chapman and Hall, London, 1968 and Onak, *Organoborane Chemistry* Academic Press, 1975 and references listed in these articles.

Likewise, the main chain (or backbone) of the polymer used can contain an amine reagent to which a borane is added to form an aminoborane. Representative but non-exhaustive examples of such reactions are

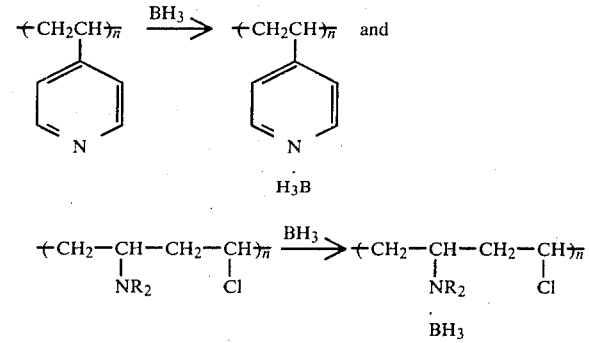

where n is the number of repeating polymer units.

The co-catalyst of the present invention can be added to the reaction mixture of the titanium tetrahalide and the polymeric resin with the amino borane reducing agent to form a complete catalyst, or it can be added to a polymerization mixture of olefin and the recovered reaction product. In general, it is preferred to prepare a complete catalyst prior to use in the reaction, although this is usually a matter of convenience and not critical.

Thus the instant invention also provides a catalyst system comprising
 (a) a polymer-supported titanium containing catalyst comprising
  (1) a polymeric resin containing bound therein an amino borane reducing agent, and
  (2) a titanium tetrahalide; together with
 (b) an organometallic co-catalyst and organometallic hydride co-catalyst or an organometallic halide co-catalyst or mixtures of these.

Although any titanium tetrahalide can be used, titanium tetrachloride is the preferred compound of the present invention.

The instant invention is more concretely described with reference to the examples below wherein all parts and percentages are by weight unless otherwise specified. The examples are provided to illustrate the instant invention and not to limit it.

EXAMPLE 1

The catalysts of the instant invention were prepared. A polystyrene polymer containing an amino borane reducing agent (Amborane-335, trademark of Rohm and Haas and sold by Alpha/Ventron Company, an air stable reducing agent with excellent shelf life) in the amount of 1.0055 grams was suspended in 50 milliliters (ml) of hexane which had been dried over activated mole sieves and purged for one (1) hour with dry argon to remove free oxygen under an argon atmosphere. Titanium tetrachloride (5.0 mls or 8.63 grams) was added by syringe and the slurry was stirred overnight at ambient temperature under an argon atmosphere.

The solid product was separated from the diluent by filtration, the recovered solids were washed four times with 50 ml of dry hexane, resuspending the solids with each wash and then refiltering under the inert atmosphere.

The beige powdery solid resulting from the washing step was thoroughly dried under vacuum to give 1.2273 grams of solid which under analysis showed 2.60 weight percent boron and 4.608% titanium based upon the total weight of the recovered solids.

EXAMPLE 2

The solid catalysts prepared in Example 1 was utilized in a polymerization reaction. A dried glass 1 liter pressure bottle was purged with argon and charged with 300 ml of dry hexane. 3.30 ml of triethylaluminum (as a 24.7% by weight slurry in heptane or 5.12 millimoles) and 0.1421 grams of these catalysts as prepared as described in Example 1 (6.50 milligrams titanium or 0.1357 millimoles). Molar ratio of triethylaluminum to titanium was 38 to 1. The bottle was heated to 60° C. in an orbit shaker constant temperature water bath. Ethylene was introduced continuously over a 1 hour period at a 42 pounds per square inch gauge pressure (psig).

After one hour ethylene addition was terminated and pressure was vented from the bottle. Thereafter the catalyst was destroyed with 1 ml of isopropanol. The resulting solids were filtered and washed with hexane to give 8.07 grams of ethylene polymer. The polymer had a melting point of 140° C. to 145° C. and a specific gravity of 0.9754.

The polymer particles obtained were of large diameter, with 60.7 weight percent of the polymer larger than 1 millimeter and 88.3 weight percent larger than 0.500 millimeters.

While certain embodiments and details have been shown for the purpose of illustrating this invention, it will be apparent to those skilled in this art that various changes and modifications may be made herein without departing from the spirit or scope of the invention.

I claim:

1. A catalyst system comprising
   (a) a polymer supported titanium containing catalyst comprising
      (1) a polymeric resin containing bound therein an amino borane reducing agent, and
      (2) titanium tetrahalide; together with
   (b) an organometallic co-catalyst, an organometallic hydride co-catalyst, an organometallic halide co-catalyst or mixtures of these.

2. The catalyst system of claim 1 wherein the polymeric resin is selected from the group consisting of polystyrene, polyvinylchloride, polyvinyl alcohol, polyethylene, polybutene, and copolymers, alloys, blends, derivatives and analogues of these.

3. The catalyst system of claim 2 wherein the titanium tetrahalide is titanium tetrachloride.

4. A catalyst system of claim 3 wherein the co-catalyst is selected from the group consisting of Grignard reagents, dibutyl magnesium, butyl ethyl magnesium, diethylaluminum chloride, triethylaluminum, diisobutylaluminum iodide, diisobutylaluminum hydride, and lithium triethyl borohydride.

5. A method for preparing a catalyst for olefin polymerizations comprising reacting under an inert atmosphere
   (1) a polymeric resin containing bound therein an aminoborane reducing agent, said resin suspended in an inert diluent, and
   (2) a titanium tetrahalide compound, then
   (3) allowing reaction to proceed between 1 and 2 to produce a solid, then recovering said solid, and
   (4) combining said solid with an organometallic, organometallic halide or an organometallic hydride co-catalyst or mixtures of these prior to carrying out a polymerization.

6. A method as described in claim 5 wherein the reaction between 1 and 2 is allowed to proceed at temperatures of from about 0° to about 100° C.

7. A method as described in claim 6 wherein the resin is selected from the group consisting of polystyrene, polyvinyl alcohol, polyvinyl chloride, polyethylene, polybutene, and alloys, copolymers, blends, derivatives and analogues of these.

8. A method as described in claim 7 wherein the diluent is a dry, organic compound having atmospheric oxygen removed therefrom.

9. A method as described in claim 8 wherein the diluent is selected from the group consisting of hexane, cyclohexane, toluene, ether, N,N-dimethylformamide, acetone or acetonitrile as well as mixtures and analogues of these.

10. A method as described in claim 9 wherein the co-catalyst is selected from the group consisting of dibutyl, magnesium, butyl ethyl magnesium, Grignard reagents, diethylaluminum chloride, triethylaluminum, diisobutylaluminum iodide, diisobutylaluminum hydride, lithium triethyl borohydride, or mixtures of these.

11. A method as described in claim 10 wherein the co-catalyst is combined with the reaction product (a) prior to contacting with olefins and carrying out polymerization.

12. A method as described in claim 10 wherein the co-catalyst is added to a polymerization mixture of olefin and the reaction product of (a).

13. A catalyst as described in claim 3 wherein the aminoborane reducing agent on the polymer is selected from the group consisting of $H_3B \cdot N(Et)_3$,

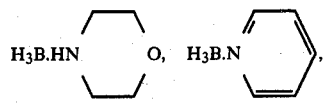

$H_3B \cdot NH_3$, and mixtures of these.

* * * * *